United States Patent [19]

Yamano et al.

[11] Patent Number: 4,814,920
[45] Date of Patent: Mar. 21, 1989

[54] MAGNETIC HEAD WITH A SLIDER

[75] Inventors: Minoru Yamano, Ibaraki; Hideo Fujiwara, Toride; Masashi Hayashi, Mizukaido; Nobuhiko Naganawa, Kitasoma, all of Japan

[73] Assignee: Hitachi Maxell, Ltd., Osaka, Japan

[21] Appl. No.: 753,440

[22] Filed: Jul. 10, 1985

[30] Foreign Application Priority Data

Jul. 10, 1984 [JP] Japan ................................ 59-141322
Sep. 19, 1984 [JP] Japan ................................ 59-194861

[51] Int. Cl.$^4$ .......................................... G11B 5/187
[52] U.S. Cl. ...................................... 360/122; 360/104
[58] Field of Search ............... 360/104, 102, 122, 103, 360/121, 118, 128

[56] References Cited

U.S. PATENT DOCUMENTS

| 4,191,980 | 3/1984 | King et al. .................... 360/122 X |
| 4,276,574 | 6/1981 | Baasch et al. ..................... 360/121 |
| 4,423,550 | 1/1984 | Fujioka et al. .................... 360/118 |
| 4,613,920 | 9/1986 | Higuchi et al. .................... 360/118 |

FOREIGN PATENT DOCUMENTS

| 8203938 | 12/1982 | European Pat. Off. ........... 360/125 |
| 0097975 | 1/1984 | European Pat. Off. ........... 360/122 |
| 0110050 | 6/1984 | European Pat. Off. ........... 360/121 |
| 0125224 | 7/1983 | Japan ................................ 360/118 |
| 0005415 | 1/1984 | Japan ................................ 360/121 |

Primary Examiner—Stuart N. Hecker
Assistant Examiner—David J. Severin
Attorney, Agent, or Firm—Birch, Stewart, Kolasch & Birch

[57] ABSTRACT

In a magnetic head with a slider, there are provided a head core made of a magnetic material having a first sliding surface for slidably contacting with a magnetic recording medium and at least one recording and reproducing gap defined on the sliding surface, a slider having a second sliding surface for slidably guiding the magnetic recording medium. The slider is connected to one side wall of the magnetic head core by an adhering material. A recess is defined on the slider along the entire length of the peripheral portion of one side wall of the magnetic head core. Chamferred parts are formed on the corner of the first sliding surface and the side wall of the magnetic head core.

10 Claims, 5 Drawing Sheets

MAGNETIC HEAD WITH A SLIDER

BACKGROUND OF THE INVENTION

The present invention relates to a magnetic head which is used for recording and playing back with a flexible recording medium such as floppy disk.

In a conventional magnetic head used for recording and playing back with a floppy disk, the magnetic head of straddle type and the magnetic head of tunnel type are used. The magnetic head of straddle type enables the width of the recording and reproducing core in the shape of I to widen, and has higher magnetic efficiency and higher output than the magnetic head of tunnel type.

FIG. 1 through FIG. 4 show one example of conventional magnetic heads of straddle type with a slider. FIG. 1 is a top plan view of a magnetic head with a slider, FIG. 2 is a cross sectional view taken on line II-II' of FIG. 1, and FIG. 3 and FIG. 4 are cross sectional views explaining a bad condition after constructing a magnetic head with a slider.

In FIG. 1 through FIG. 4, a magnetic head 1 with a slider comprises a magnetic head core and a slider 2 for slidably guiding the floppy disk by the top surface of the slider. The slider is made of nonmagnetic materials such as ceramics or the like which has an endurable characteristic against abrasion and the magnetic head core includes at least one recording and reproducing head core 3 made of magnetic materials such as ferrite.

As shown in FIG. 1, the slider 2 has a pair of erasing head cores 5 made of magnetic materials such as ferrite with an erasing gap 4, and a ditch 6, as shown in FIGS. 1 and 2. On the other hand, the recording and reproducing magnetic head core 3 has a recording and reproducing gap 7 as shown in FIG. 1.

The slider 2 and the recording and reproducing head core 3 are bonded as one body by adhering materials 8, as shown in FIGS. 1 and 2. In general, sliding surfaces 10 and 11 of the slider 2 and the recording and reproducing magnetic head core 3, which are touched with a floppy disk 9, are finished minutely by lapping.

Although the sliding surface 10 of the slider 2 and the sliding surface 11 of the recording and reproducing head core 3 are finished minutely by lapping, the conventional magnetic head 1 has a drawback that a change of temperature and humidity makes a small step 12 between the sliding surface 10 of the slider 2 and the sliding surface 11 of the recording and reproducing magnetic head core 3, as shown in FIGS. 3 and 4. For example, the step 12 is caused, when the sliding surface 11 of the recording and reproducing magnetic head core 3 thrusts out, as shown in FIG. 3, and conversely when the recording and reproducing head core 3 sinks below the sliding surface 10 of the slider 2, as shown in FIG. 4. Although the height of the step 12 is a small value which is smaller than 1 micrometer, the step 12 could have an important influence upon a function of a disk playing device.

Therefore, as shown in FIG. 3, in case the sliding surface 11 of the recording and reproducing head core 3 thrusts out above the sliding surface 10 of the slider 2, a sharp edge 13 of the recording and reproducing head core 3 damages a surface of the floppy disk 9. On the other hand, as shown in FIG. 4, in case the sliding surface 11 of the recording and reproducing head core 3 sinks below the sliding surface 10 of the slider 2, a spacing loss when recording and reproducing may be undesirably increased.

SUMMARY OF THE INVENTION

An essential object of the present invention is to solve the above problems, and to provide a magnetic head which prevents developing a step between sliding surfaces of the slider and a magnetic head core which has a recording and reproducing head core so as to prevent from damaging a magnetic medium, and to decrease a spacing loss between the head core and the magnetic recording medium.

Another object of the present invention is to provide a magnetic head for enabling to stabilize a contact between a recording medium and the magnetic head, and also to assure a connection between the magnetic head and the slider.

In order to accomplish the above object, there is provided a magnetic head with a slider, comprising a head core made of a magnetic material having a first sliding surface for slidably contacting with a magnetic recording medium, side walls and at least one recording and reproducing gap defined on the sliding surface, slider means having a second sliding surface for slidably guiding the magnetic recording medium, the slider means being fixedly connected to at least one of the side walls of the magnetic head core by adhering material, recess portion defined in the connecting portion connected with the magnetic head core of the slider means along the whole length of the peripheral portion of the magnetic head core, and a chamferred means formed on the corner of the first sliding surface of the magnetic head core.

Moreover, in order to accomplish a further object of the present invention, a length of a coil winding window of an erasing head core is to be longer than one of the recording and reproducing head core, and an erasing coil is wound at a bottom of the coil winding window, moreover, as a result, it becomes possible to increase the connecting area between the head core and the slider so that the connecting force between the head core and slider can be increased.

It is caused by forming the recessed part in the peripheral part of the magnetic head core and by forming the cut part at the corner of the sliding surface of the magnetic head core thrusting out in the recessed part, that the bad condition due to the level difference between the sliding surfaces of the slider and the magnetic head to be decreased by the recessed part, and that the magnetic recording medium can be prevented from being damaged and moreover, that the spacing loss can be decreased.

DETAILED DESCRIPTION OF A PREFERRED EMBODIMENT

Figure 1:
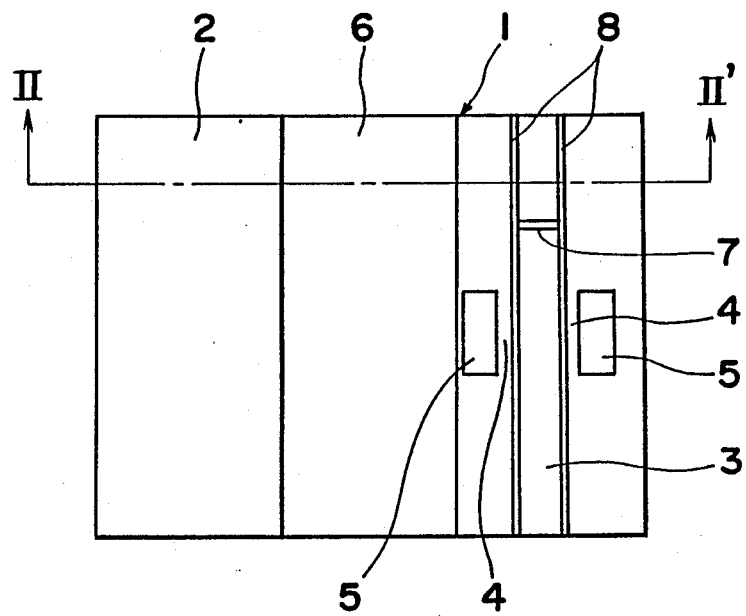
FIG. 1 is a top plan view of a conventional magnetic head with a slider.

Before the description proceeds, it is noted that like parts are designated by like reference numerals throughout the drawings.

Figure 5:
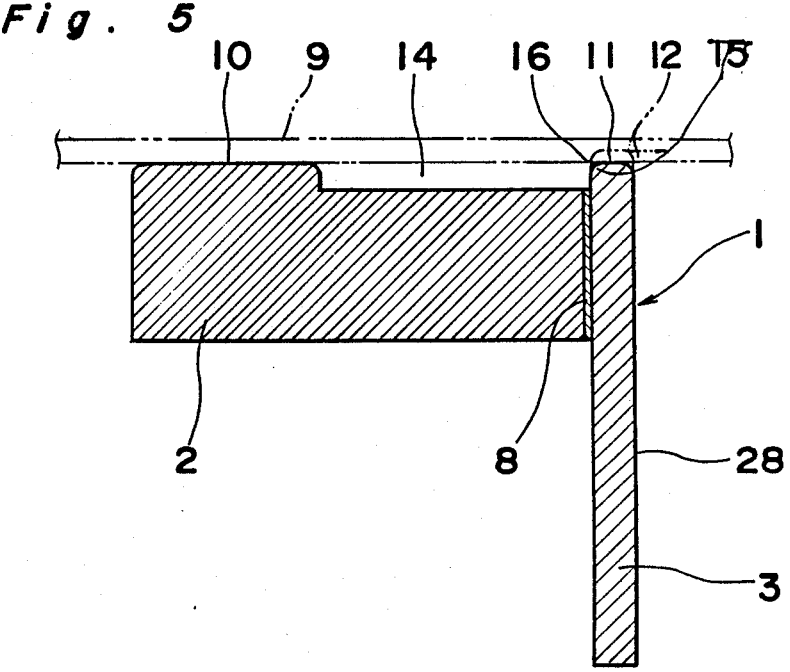
FIG. 5 is a cross sectional view showing a partial surface of one example of a magnetic head with a slider according to the present invention.

As shown in FIG. 5, a magnetic head core 28 comprises only a recording and reproducing magnetic head core 3 without an erasing head core 5. The magnetic head core may comprise an erasing head core as described hereinafter.

A recess 14 is defined in a slider in a peripheral part of the magnetic head core 3. The recess is formed so as to extend in a straight line along the entire length of the side wall of the magnetic head core 28. Corner parts 15 of the magnetic head core 3 thrust out into the hollow part 14, and chamferred parts 16 in a round form are formed at the corner parts 15.

Figure 2:
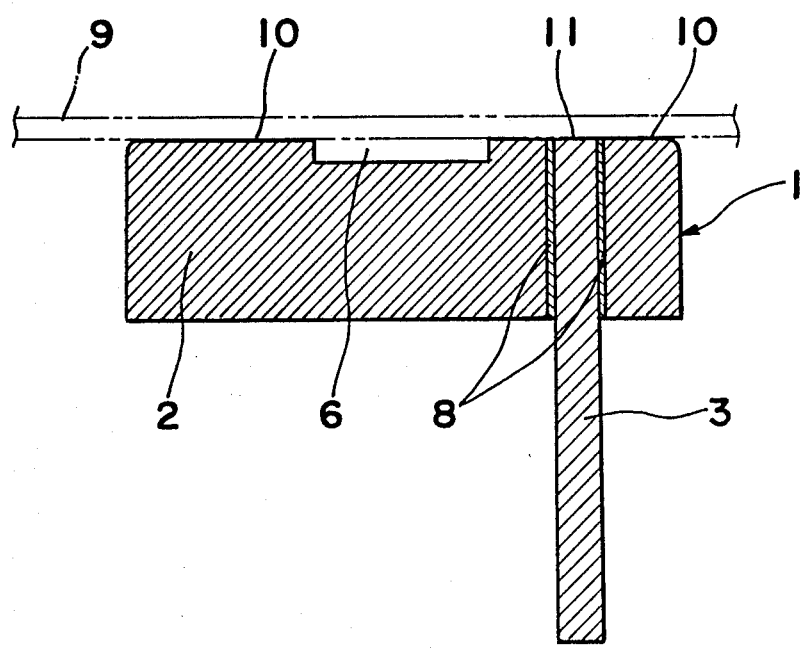
FIG. 2 is a cross sectional view taken on line II-II' of FIG. 1.

In the above construction of the magnetic head 1 with a slider as shown in FIG. 5, the different points from the magnetic head 1 with the slider in FIG. 2 are as follows. In the magnetic head with the slider according to the conventional art as shown in FIG. 2, the sliding surface 10 of the slider 2 is placed adjacent to the sliding surface 11 of the magnetic head core 3. On the other hand, in FIG. 5, the recess 14 is formed in the slider at the peripheral part of the magnetic head core 3, and the sliding surface 10 of the slider 2 is formed away from the sliding surface of the magnetic head core 3 by the recess 14 and also the chamferred parts 16 are defined at the corner parts 15 of the magnetic head core 3 which thrusts out into the recess 14. That is, as shown in FIG. 5, as the sliding surface 10 of the slider 2 is formed away from the sliding surface 11 of the magnetic head core 3 by forming the recess 14 at the peripheral part of the magnetic head core 3, even if there occurs a level difference between the sliding surface 10 of the slider 2 and top surface 11 of the magnetic head core 3 similar to the step 12 shown in FIGS. 3 and 4, when the magnetic head core 3 is displaced, the level difference 12 is minimized by the recess 14. Namely, a magnetic recording medium 9 touches closely with the sliding surface 11 of the magnetic head core 3 because the level difference 12 will not effect the touch between the magnetic medium 9 and the magnetic head core 3. As a result, the spacing loss between the magnetic medium 9 and the magnetic head core 3 can be decreased.

Figure 3:
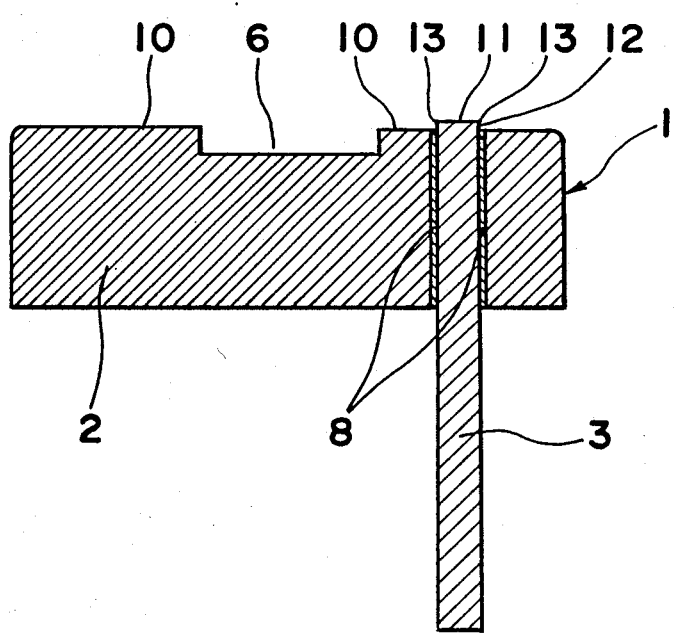
FIGS. 3 and 4 are cross sectional views explaining a bad condition of a magnetic head.

Moreover, a sharp edge 13 as shown in FIG. 3, is not formed at the magnetic head core 3 because the chamferred parts 16 are formed at the corner parts 15 of the magnetic head core 3. In result, the chamferred parts 16 can prevent damage to the magnetic medium 9 by the magnetic head core 3 during recording and play back.

In the above example of FIG. 5, since the bad effect to the recording medium due to the level difference 12 between the sliding surface 10 of the slider 2 and the sliding surface 11 of the magnetic head core 3 can be decreased by the recess part 14, it may not be necessary to strictly and precisely align the sliding surface 10 of the slider 2 and the sliding surface 11 of the magnetic head core 3. Therefore, the cost of the production of the magnetic head 3 may be decreased.

Figure 6:
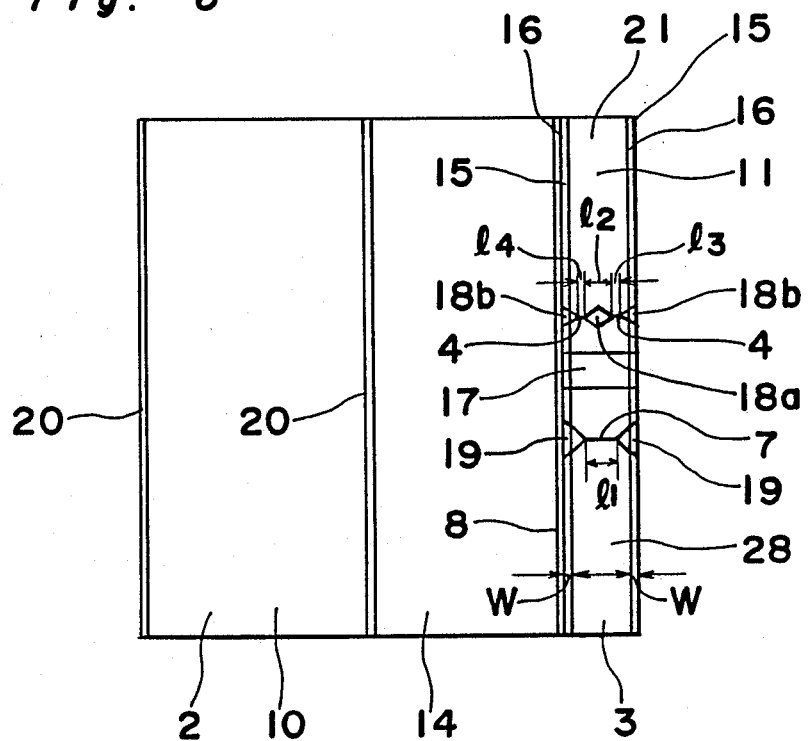
FIG. 6 is a top plan view of another example of a magnetic head with a slider according to the present invention.
Figure 7:
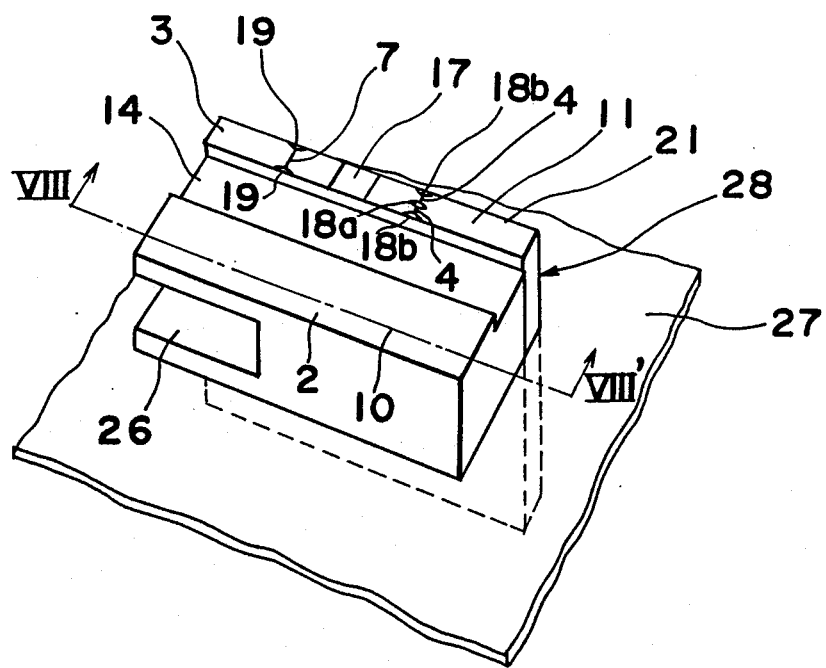
FIG. 7 is a perspective view when the magnetic head with the slider in FIG. 6 is arranged at a ginbal support system.

Referring to FIG. 6 through FIG. 9, another example of the magnetic head according to the present invention will be explained. In the example, as shown in FIGS. 6 and 7, the magnetic head core 28 comprises the recording and reproducing magnetic head core 3, the erasing head core 21 and a nonmagnetic layer 17 such as ceramics etc., arranged between the head cores 3 and 21 to separate the recording and reproducing head core 3 from the erasing head core 21, magnetically.

Figure 8:
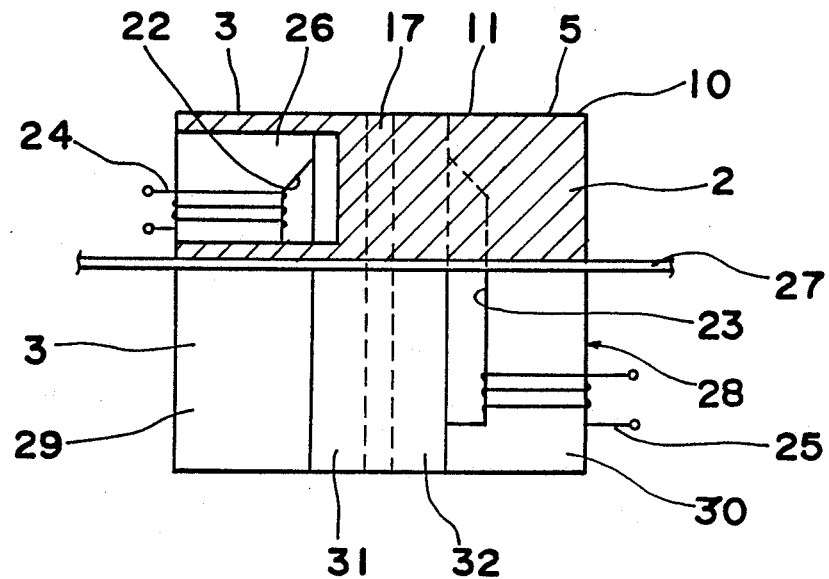
FIG. 8 is a cross sectional view taken on line VIII--VIII' of FIG. 7.

As shown in FIG. 8, the recording and reproducing head core 3 and the erasing head core 21 are respectively formed by cores 29 and 30 having a C character shape made of magnetic materials, such as ferrite or the like, where a coil winding window 22 is defined and cores 31 and 32 in the shape of plate, wherein the C type cores 29 and 30 are connected with the cores 31 and 32 in a plate shape. As shown in FIG. 6, the top surface of the magnetic head core 28 on which the magnetic recording medium contacts a recording and reproducing gap 7 is formed at the connection part between the C type core 29 and the plate core 31, and an erasing gap is formed at the connection part between the C type core 30 and the plate core 32. The length and the position of these gaps 7 and 4 are limited by nonmagnetic reinforcing parts 18a, 18b and 19, made of glass, etc.

In the recording and reproducing head core 3, the two reinforcing parts 19 in the shape of triangle in plan view are fixedly formed from the top surface of the recording and reproducing head core 3 to the top end of the coil winding window 22 at both side ends of the recording and reproducing head core 3, and the length l1 of the gap 4 is determined by the two reinforcing parts 19. On the other hand, in the erasing head core 21, the lengths l3 and l4 of the gap 7 are determined by two reinforcing parts 18b arranged at both side ends of the erasing head core 21 and a reinforcing part 18a arranged at the center of the head core 21, wherein the reinforcing parts 18a and 18b are arranged at the center of the head core 21 used for erasing so that two off track parts at the top side and the bottom side of the magnetic track on the magnetic medium, which is recorded by the recording and reproducing gap 7, can be erased and the erasing gap 4 can be arranged at the top and bottom side end of the recording and reproducing gap 7. Therefore, the length l2 of the reinforcing part 18a will be designed to be shorter than or equal to l1.

The reinforcing parts 18a and 18b serve to reinforce the mechanical strength of the magnetic head core 28 and to prevent from breaking of a part the cores defining the recording and reproducing gap 7 and the erasing gap 4. The chamferred parts 16 are formed at the corner parts 15 of the both side ends of the magnetic head core 28, and the chamferred parts 16 prevent from damaging the magnetic recording medium when the magnetic recording medium runs touched with the the magnetic head core 28 during recording and play back thereof.

As shown in FIG. 6, if the width W of the chamferred parts 16 is designed to be shorter than the reinforcing part 18b, this design can not deteriorate the electromagnetic conversional characteristics of the magnetic head core 28 and also can prevent from damaging the magnetic recording medium. Moreover, chamferred parts 20 are formed at the corner part of the slider 2.

As shown in FIGS. 6 and 7, the magnetic head core 28 is connected with the slider 2 made of ceramics which has an endurable characteristic against abrasion such as Mn-Zn, ferrite, etc. at one side end surface of the magnetic head core 28 as one body by adhering agent 18, such as epoxy resin.

Figure 4:
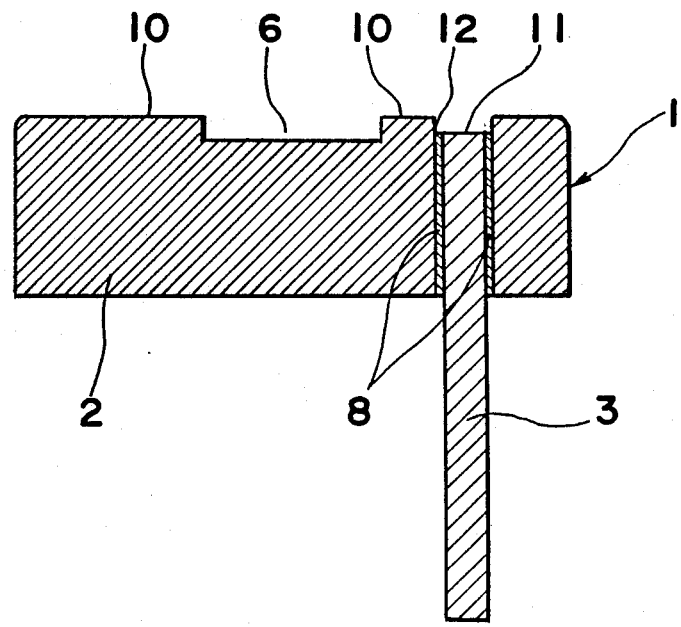

At the adjacent part of the slider 2 to the magnetic head core 28, the recess 14 is formed in parallel with the magnetic head core 28. The sliding surface 10 of the slider 2 is apart from the sliding surface 11 of the magnetic head core 28 by the length and width of the recess 14, and the sliding surface 11 of the magnetic head core 28 thrusts out above or sinks below the sliding surface 10 of the slider 2. As a result, the step 12 will be caused as shown in FIGS. 3 and 4. However, the step 12 can be compensated for by the recess 14 and contact of the magnetic medium with the magnetic head core 28 can be assured. Therefore, the spacing loss of the magnetic head core 28 can be decreased.

In the above description, as shown in FIG. 3, as the chamferred parts 16 are formed at the corner parts 15 of the both side ends of the magnetic head core 28, the chamferred parts 16 prevent from damaging the magnetic medium 9 by the edge 13 at the corner parts 15 of both side ends of the magnetic head core 28.

As shown in FIG. 8, a cut ditch 26 is formed at the side surface of the slider 2 corresponding to the side of the recording and reproducing head core 3, wherein the cut ditch 26 passes through to the side end of the recording and reproducing head core 3. The cut ditch 26 and the coil winding window 22 of the recording and reproducing head core 3 pass through together continuously, and the coil winding part 24 of the recording and reproducing head core 3 is uncovered. Therefore, it is possible to wind the coil easily through the coil winding window 22 of the recording and reproducing head core 3 after the magnetic head core 28 is fixedly connected with the slider 2.

Figure 9:
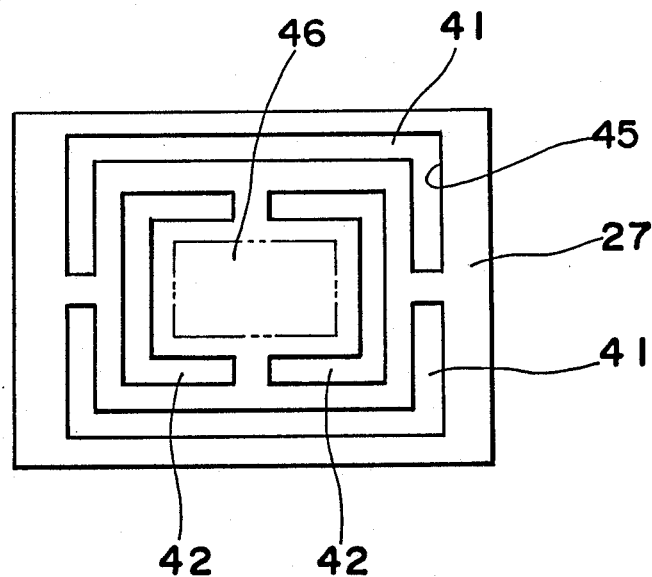
FIG. 9 is a plan view of a ginbal plate used for arranging at a magnetic head with a slider according to the present invention.

On the other hand, as shown in FIG. 9, the magnetic head with the slider which is made as in the above explanation is used arranging on a gimbal plate 27 which consists of a resilient material with slits 41 and 42 cut, then it is necessary for the distance between the sliding surface 11 of the magnetic head core 28 and the surface of the ginbal plate to be short in order that the magnetic head core 28 may stably touch the magnetic medium 9. Moreover, it is necessary for the coil winding window 22 of the recording magnetic head core 3 to be as small as possible and to be close to the sliding surface 11.

In the preferred embodiment, in order to satisfy the above necessary requirement, as shown in FIG. 8, the thickness of the slider 2 can be thinner than one in the the prior art by the small coil winding window 22 of the recording and reproducing head core 3, and the distance between the surface of the gimbal plate 27 and the sliding surface 11 of the magnetic head core 28 can be shorter than one in the prior art. In result, although the area of connection between the head cores 3, 28 and the slider 2 is decreased, the whole area of the surface of the slider corresponding to the erasing head core 21 is bonded, so that bonding force of the erasing head core 21 can be increased. Moreover, the coil 25 of the erasing head core 21 is wound in at the lower part than the surface of the gimbal plate 27. That is, the length of the coil winding window 23 of the erasing head core 21 is formed to be long enough to be projected downwardly beyond the ginbal plate 27.

In general, as the erasing head core 21 has an erasing efficiency to spare, the head core 21 with the big window, as in this embodiment, shows an acceptable erasing efficiency.

In FIG. 9, showing a plan of the ginbal plate 27, gap parts 41, 42 and 45 are formed at the supporting body which consists of metal board, for example as shown in FIG. 9. The magnetic head 1 with the slider is fixedly placed at the arranging part 46 of the magnetic head with the slider, and the magnetic head 1 is arranged so that it can move sufficiently and may have a sufficient pressing force to the magnetic medium 9.

Figure 10:
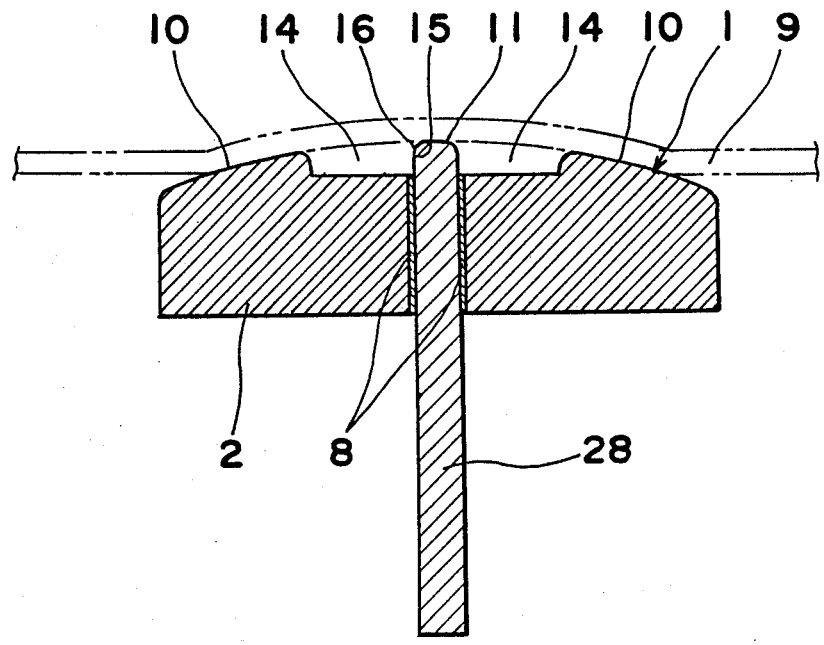
FIG. 10 is a cross sectional view of another example of a magnetic head with a slider

FIG. 10 shows one example of a slider 2 of a button type, which corresponds to the example of FIG. 5. In FIG. 10 the different points from one of FIG. 5 are as follows. In FIG. 5, the magnetic head core 3 is arranged at the end part of the slider 2. On the other hand, in FIG. 10, the magnetic head core 3 is fixedly arranged at the center of the slider 2, and the recess 14 is arranged at the sliding surface 10 of the slider 2 is formed in the shape of a curved surface.

As shown in FIG. 10, as the recess 14 is defined at the peripheral part of the slider 2 and the sliding surface 10 of the slider 2 is formed in the shape of a curved surface, the magnetic recording medium 9 may run along the surface of the slider 2 conforming to the shape of the curved surface. Therefore, if the step 12 or level difference, such as about 1 micrometer, is caused by the shape of curved surface, the step 12 can be compensated for by the magnetic recording medium 9 deformed in the shape of curved surface.

Moreover, the chamferred parts 16 are formed at the corner parts 15 of the magnetic head core 3. In this case, as shown in FIG. 6, it may be possible for the magnetic head core 28 to be arranged with the erasing head core 21.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic head, comprising:
    a head core made of a magnetic material having a siding surface adapted to be slidably contiguous with a magnetic recording medium, side walls and at least one recording and reproducing gap defined at said sliding surface, said magnetic head core having chamferred portions formed at corners of said sliding surface,
    slider means having a sliding surface adapted to slidably guide said magnetic recording medium, said slider means being connected by a connecting portion to a least one of said side walls of said magnetic head core by an adhering material; and
    a recess defined in said connecting portion of said slider means connected with said magnetic head core along the entire length of a peripheral portion of said magnetic head core, such that the portion of said head core adapted to be contiguous with said recording medium is not contacted by a slider means on either side of said head core.

2. The magnetic head of claim 1, wherein only one side wall of said head core is connected with the slider means by connecting materials.

3. The magnetic head of claim 1, wherein said magnetic head core further comprises an erasing head core, the recording and reproducing head core and the erasing head core being juxtaposed through a nonmagnetic layer, both head cores being provided with coil winding windows so that the length of the coil winding window of the erasing head core measured from the sliding surface of the recording head core is longer than the length of the coil winding window of the recording head core and so that a coil for the erasing head core is wound in the portion corresponding to the lower portion of the coil winding window of the erasing head core.

4. The magnetic head of claim 3, wherein the side surface of the recording and reproducing head core is bonded with one of the side surfaces of the slider means except for a coil winding window of the recording head core and the side surface of the erasing head core is bonded with the whole area of the other side surface of the slider means.

5. The magnetic head of claim 4, wherein a cut ditch part passing through to the side end of said recording head core is formed in the portion of the slider means facing to the recording head core in the part corresponding to said coil winding windows and a coil wound part of the recording head core.

6. The magnetic head of claim 1, wherein said head core comprises a recording head core having said recording and reproducing gap and an erasing head core with erasing gaps formed on the areas of erasing head core corresponding to both outside portions of the said recording gap said recording head core and erasing head core being integrally formed into substantially one body.

7. The magnetic head of claim 6, wherein said erasing gaps are formed in areas and limited by nonmagnetic reinforcing members arranged at both side end portions and a center portion of said erasing head core.

8. The magnetic head of claim 7, wherein said recording and reproducing gap of said recording and reproducing head core is limited by two nonmagnetic reinforcing members arranged at both sides of said recorded head core.

9. The magnetic head of claim 7, wherein said nonmagnetic reinforcing members for limiting the erasing gap are glass.

10. The magnetic head of claim 7, wherein the width of the chamferred portions formed at the corners of said magnetic head core ranges within a width of said two non-magnetic reinforcing members formed at the side ends of said recording head core.

* * * * *